United States Patent
Lee et al.

(10) Patent No.: US 9,513,419 B2
(45) Date of Patent: *Dec. 6, 2016

(54) APPARATUS FOR CONTROLLING COLOR OF POLARIZING FILM AND METHOD OF CONTROLLING THE SAME

(71) Applicant: LG CHEM, LTD., Seoul (KR)

(72) Inventors: Chang Song Lee, Daejeon (KR); Ho Kyung Lee, Daejeon (KR); Eungki Lee, Chungcheongbuk-do (KR); DaeHyeon Kim, Daejeon (KR); Eung Jin JangASGNLG CHEM, LTD., Seoul (KR)

(*) Notice: Subject to any disclaimer, the term of this patent is extended or adjusted under 35 U.S.C. 154(b) by 30 days.

This patent is subject to a terminal disclaimer.

(21) Appl. No.: 14/344,561

(22) PCT Filed: Sep. 20, 2012

(86) PCT No.: PCT/KR2012/007509
§ 371 (c)(1),
(2) Date: Mar. 12, 2014

(87) PCT Pub. No.: WO2013/048058
PCT Pub. Date: Apr. 4, 2013

(65) Prior Publication Data
US 2014/0340748 A1      Nov. 20, 2014

(30) Foreign Application Priority Data

Sep. 29, 2011   (KR) ................. 10-2011-0098663

(51) Int. Cl.
| | |
|---|---|
| *B05C 3/09* | (2006.01) |
| *G02B 5/30* | (2006.01) |
| *B05D 1/18* | (2006.01) |

(Continued)

(52) U.S. Cl.
CPC ............. *G02B 5/3033* (2013.01); *B05C 3/09* (2013.01); *B05D 1/18* (2013.01); *G02B 1/08* (2013.01); *G02B 5/3041* (2013.01); *G02B 1/105* (2013.01)

(58) Field of Classification Search
CPC ............ B01F 13/1063; B01F 13/1069; B01F 15/0216; D06P 1/0032; B05C 3/09; B05D 1/18

See application file for complete search history.

(56) References Cited

U.S. PATENT DOCUMENTS

| | | | | |
|---|---|---|---|---|
| 5,335,187 A | * | 8/1994 | Koizumi ............... | D06P 1/0032 8/400 |
| 5,917,119 A | * | 6/1999 | Yamakaji ............... | D06P 1/0032 8/400 |
| 6,272,440 B1 | * | 8/2001 | Shakespeare ............. | G01J 3/46 250/559.04 |

(Continued)

FOREIGN PATENT DOCUMENTS

| | | |
|---|---|---|
| JP | 2004-020632 A | 1/2004 |
| JP | 2006189560 A | 7/2006 |

(Continued)

*Primary Examiner* — Karl Kurple
(74) *Attorney, Agent, or Firm* — Dentons US LLP

(57) ABSTRACT

An apparatus for controlling a color of a film includes a dyeing bath to dip a washed PVA film in an aqueous iodine solution and an aqueous potassium solution and then dye the PVA film therewith, a complementary bath to dip the PVA film in an aqueous potassium solution and then dye the PVA film therewith, a device oven to dry the PVA film having the oriented iodine and potassium, a 4-stage oven to dry the PVA film dried in the device oven, and a central controller to predict a color value of the polarizing film.

10 Claims, 5 Drawing Sheets

(51) Int. Cl.
*G02B 1/08* (2006.01)
*G02B 1/10* (2015.01)

(56) References Cited

U.S. PATENT DOCUMENTS

| | | | | |
|---|---|---|---|---|
| 8,625,095 | B2* | 1/2014 | Lee | G01N 21/94 |
| | | | | 356/364 |
| 8,767,296 | B2* | 7/2014 | Lee | B29D 7/01 |
| | | | | 264/1.34 |
| 8,771,454 | B2* | 7/2014 | Goto | B29C 55/026 |
| | | | | 156/229 |
| 2002/0008847 | A1* | 1/2002 | Ayoub | B24B 1/00 |
| | | | | 351/159.62 |
| 2004/0190367 | A1* | 9/2004 | Wierzbicki | B01F 15/00207 |
| | | | | 366/140 |
| 2006/0172076 | A1* | 8/2006 | Rearick | B05D 7/142 |
| | | | | 427/430.1 |
| 2007/0111017 | A1* | 5/2007 | Masuda | B29C 55/06 |
| | | | | 428/500 |
| 2008/0286455 | A1* | 11/2008 | Hamamoto | B08B 3/041 |
| | | | | 427/163.1 |
| 2010/0238383 | A1* | 9/2010 | Nakano | G02B 5/3033 |
| | | | | 349/96 |
| 2013/0170032 | A1* | 7/2013 | Lee | B29D 7/01 |
| | | | | 359/483.01 |

FOREIGN PATENT DOCUMENTS

| | | | |
|---|---|---|---|
| JP | 2007212587 A | 8/2007 | |
| JP | 2007226035 A | 9/2007 | |
| JP | WO 2008001640 A1 * | 1/2008 | ............ G01N 21/31 |
| JP | 2010-191293 A | 9/2010 | |
| KR | 10-2006-0080189 A | 7/2006 | |
| KR | 10-2009-0033188 A | 4/2009 | |
| KR | 10-2009-0109074 A | 10/2009 | |
| KR | 10-2010-0003558 A | 1/2010 | |
| KR | 10-2010-0102933 A | 9/2010 | |
| TW | 2006-31768 | 9/2006 | |
| TW | 2008-01601 A | 1/2008 | |
| TW | 2010-00301 A | 1/2010 | |
| WO | 2010087653 A2 | 8/2010 | |

* cited by examiner

APPARATUS FOR CONTROLLING COLOR OF POLARIZING FILM AND METHOD OF CONTROLLING THE SAME

This application is a 35 USC §371 National Stage entry of International Application No. PCT/KR2012/007509, filed on Sep. 20, 2012, which claims priority of Korean Application No. 10-2011-0098663, filed on Sep. 29, 2011, all of which are hereby incorporated by reference in their entirety.

TECHNICAL FIELD

The present invention relates to an apparatus for controlling color of a polarizing film. More specifically, the present invention relates to an apparatus for controlling a color of a film that exhibits polarizing properties (hereinafter, referred to as a 'polarizing film') by dyeing a substrate film with iodine and potassium through a continuous process and then orienting the dyed film, wherein the apparatus comprises: a dyeing bath to dip a washed PVA film in an aqueous iodine solution and an aqueous potassium solution and then dye the PVA film therewith; a complementary bath to dip the PVA film in an aqueous potassium solution and then dye the PVA film therewith; a device oven to dry the PVA film having the oriented iodine and potassium; a 4-stage oven to dry the PVA film dried in the device oven; and a central controller to predict a color value of the polarizing film, on the basis of information regarding characteristics of input data measured through the iodine and potassium densitometers of the dyeing bath, the potassium densitometer of the complementary bath and the thermometers of the device oven and the 4-stage oven, and information regarding characteristics of the PVA film introduced into the continuous process, and to control temperatures of the device oven and the 4-stage oven and amounts of compositions fed to the dyeing bath and complementary bath.

BACKGROUND ART

In general, a polarizing sheet or polarizing film functions to convert natural light into polarized light. Such polarizing function may be realized with a material with which a polarizing sheet is dyed. A liquid crystal display generally uses an iodine type polarizing film dyed with iodine, as a polarizing material.

Such an iodine type polarizing film is manufactured by dyeing a polyvinyl alcohol (PVA) film with dichroic iodine or dichroic dyes and orienting the PVA film in a predetermined direction by a method such as uniaxial drawing (or orientation) and is widely used in LCDs. For instance, a process including uniaxially orienting an un-oriented PVA film in an aqueous solution and then dipping the oriented PVA film in a solution containing iodine and/or potassium iodide, a process including dipping an un-oriented PVA film in a solution containing iodine and/or potassium iodide and then uniaxially orienting the PVA film, a process of uniaxially orienting an un-oriented PVA film in a solution containing iodine and/or potassium iodide, a process including uniaxially orienting an un-oriented PVA film in a dried state and then dipping the oriented PVA film in a solution containing iodine and/or potassium iodide, and the like, may be used to prepare a polarizing film.

The PVA film having iodine adsorbed and oriented therein may be subjected to post-treatment through washing with water or drying to obtain a polarizing film and a polarizing sheet is obtained by laminating a protective film to at least one side of the formed polarizing film.

Meanwhile, in the case where the PVA film is changed (replaced) during manufacture of the polarizing sheet, a sample is taken by preparing a polarizing film through trial operation and then cutting the polarizing film, and a color value of the sample is measured. Thereafter, in order to comply with standard specifications, the sample is generally treated by applying process factors, adding subsidiary materials thereto, and/or diluting the sample.

However, the method of measuring a color value of a polarizing film after preparing the same through trial operation as described above entails problems of increased PVA film loss and production cost due to shut-down of a production line in order to measure the color values. Furthermore, considering that the polarizing film is commonly prepared through a continuous process, consumption of a large amount of PVA film cannot be avoided during measurement of color values.

Accordingly, there is a strong demand for a novel apparatus for controlling a color of a polarizing film capable of solving problems of the conventional art described above and minimizing loss of materials when a PVA film is replaced.

DISCLOSURE

Technical Problem

Therefore, the present invention has been made to solve the above and other technical problems that have yet to be resolved.

As a result of a variety of extensive and intensive studies and experiments to solve the problems as described above, the present inventors discovered that, when an apparatus for controlling a polarizing film color is designed to include a central controller to predict a color value of the polarizing film, on the basis of information regarding characteristics of input data measured through iodine and potassium densitometers of a dyeing bath, a potassium densitometer of a complementary bath and thermometers of a device oven and a 4-stage oven, and information regarding characteristics of the PVA film introduced into a continuous process, and to control temperatures of the device oven and the 4-stage oven and amounts of compositions fed to the dyeing bath and complementary bath, loss of material for the PVA film can be reduced and production line shutdown can be minimized by predicting a color value of the polarizing film, on the basis of characteristics of the PVA film fed during manufacture of the polarizing film and then previously controlling temperatures of respective components and amounts of fed compositions. The present invention has been completed, based on this discovery.

Technical Solution

In accordance with one aspect of the present invention, provided is an apparatus for controlling a color of a film that exhibits polarizing properties (hereinafter, referred to as a 'polarizing film') by dyeing a substrate film with iodine and potassium through a continuous process and then orienting the dyed film, wherein the apparatus includes:

a dyeing bath to dip a washed PVA film in an aqueous iodine solution and an aqueous potassium solution and then dye the PVA film therewith, the dyeing bath including an iodine densitometer and a potassium densitometer to measure concentrations of iodine and potassium;

a complementary bath to dip the PVA film in an aqueous potassium solution and then dye the PVA film therewith, the complementary bath including a potassium densitometer to measure a concentration of potassium;

a device oven to dry the PVA film having the oriented iodine and potassium, the device oven including a device oven thermometer to measure a temperature of the device oven;

a 4-stage oven to dry the PVA film dried in the device oven, the 4-stage oven including a 4-stage oven thermometer to measure a temperature of the 4-stage oven; and a central controller to predict a color value of the polarizing film, on the basis of information regarding characteristics of input data measured through the iodine and potassium densitometers of the dyeing bath, the potassium densitometer of the complementary bath, and the thermometers of the device oven and the 4-stage oven, and information regarding characteristics of the PVA film introduced into the continuous process, and to control temperatures of the device oven and the 4-stage oven and amounts of compositions fed to the dyeing bath and the complementary bath.

That is, the apparatus for controlling a polarizing film color according to the present invention predicts a color value of a polarizing film, based on iodine and potassium concentrations of the dyeing bath, a potassium concentration of the complementary bath and temperature data of the device oven and 4-stage oven that have the highest correlation among factors affecting the color value of a polarizing film, and information regarding characteristics of the PVA film introduced into the continuous process, and controls amounts of compositions introduced into the dyeing bath and the complementary bath, based on the predicted color value. Accordingly, for example, as compared to a conventional process for controlling a polarizing film color, wherein, when a PVA film is replaced, an amount of a feed composition is controlled after preparing the polarizing film during trial operation and measurement of a color value thereof, the present invention does not entail production line shutdown and an increase in consumption of PVA film for trial operation, thereby reducing PVA film loss while improving utilization of the production line.

Also, the apparatus for controlling a polarizing film color according to the present invention can predict a color value of a polarizing film and thereby control temperatures of the device oven and the 4-stage oven and amounts of composition fed to the dyeing bath and complementary bath, thus greatly improving qualities of color value which is an important optical property of the polarizing film.

In one preferred embodiment, the device oven includes two device ovens, i.e., a first device oven and a second device oven.

In another preferred embodiment, the 4-stage oven includes four ovens and, more specifically, the four ovens include an inclined oven having an inclined structure, and a first stage oven, a second stage oven and a third stage oven having a parallel structure.

The dyeing bath functions to dip a washed PVA film in an aqueous iodine solution and an aqueous potassium solution and dye the PVA film therewith. Accordingly, the composition fed to the dyeing bath may comprise iodine and potassium.

The complementary bath functions to dip the PVA film dyed with iodine and potassium in an aqueous potassium solution and dye the PVA film therewith. Accordingly, the composition fed to the complementary bath may comprise potassium.

In a preferred embodiment, the apparatus for controlling a polarizing film color according to the present invention may further include a composition feeder to add the composition fed to the dyeing bath and the complementary bath, based on the result of color value predicted through the central controller. Accordingly, the iodine and potassium contained in the composition can be automatically fed to the dyeing bath and the complementary bath through the composition feeder, based on the result of the predicted color value of the PVA film.

The prediction of the color value of the PVA film is preferably accomplished by a PVA film color value prediction model based on partial least squares.

For reference, the partial least square method refers to a method of processing measured results by estimating sums of squares from measured values and calculating a least value thereof.

The PVA film color value prediction model based on partial least squares is for example multiple regression analysis that predicts a color value of a PVA film based on temperatures measured through the thermometers of the device oven and the 4-stage oven, and concentration values measured through the densitometer of the dyeing bath and complementary bath.

In a specific embodiment, the PVA film color value prediction model may include a function regarding a potassium concentration of the complementary bath, iodine and potassium concentrations of the dyeing bath, a temperature of the device oven including two ovens, and a temperature of the 4-stage oven including four ovens.

For example, the prediction model of PVA film color value may be represented by the following equation:

$$\text{Prediction model of } PVA \text{ film color value} = ax_1 + bx_2 + cx_3 + dx_4 + ex_5 + fx_6 + gx_7 + hx_8 + ix_9 + h$$

wherein $x_1$ is a potassium concentration of a complementary bath, $x_2$ is an iodine concentration of a dyeing bath, $x_3$ is a potassium concentration of a dyeing bath, $x_4$ is a temperature of an inclined oven, $x_5$ is a temperature of a first stage oven, $x_6$ is a temperature of a second stage oven, $x_7$ is a temperature of a third stage oven, $x_8$ is a temperature of a first device oven, and $x_9$ is a temperature of a second device oven.

Also, in the equation above, a, b, c, d, e, f, g, h, and i are regression coefficients obtained through partial least squares and h is a constant obtained through partial least squares.

The inventors of the present application conducted a multiple regression analysis model using, as input data, nine primary variables including a potassium concentration of the complementary bath, iodine and potassium concentrations of the dyeing bath, temperatures of two device ovens, and temperatures of four ovens of the 4-stage oven. As a result, as shown in FIG. 4 below, a correlation coefficient is 0.8037, which means that a color value of the polarizing film predicted from a predetermined PVA film has an accuracy of 80% or more, as compared to a color value of a polarizing film actually measured from the PVA film.

Meanwhile, the apparatus for controlling a polarizing film color according to the present invention may further include a washing bath to wash a polyvinyl alcohol (PVA) film as a substrate film with water and a drawing bath to draw the PVA film dyed with iodine and potassium using a drawing roller and thereby orient the dyed iodine and potassium.

For example, the washing bath is disposed in front of the dyeing bath and the drawing bath is disposed in front of the complementary bath.

If desired, the apparatus for controlling a polarizing film color according to the present invention may further include a swelling bath to swell the washed PVA film and a cleaning bath to clean the dyed PVA film.

In this case, the swelling bath is disposed in front of the dyeing bath and the cleaning bath is disposed at the rear of the dyeing bath.

The present invention also provides a polarizing sheet produced by attaching a protective film to each of upper and lower surfaces of the polarizing film formed by the control apparatus as described above.

The protective film may comprise triacetyl cellulose (TAC).

The present invention also provides a method for controlling a polarizing film color. Specifically, the method for controlling the polarizing film color includes:

dyeing including dipping the washed PVA film in a dyeing bath containing an aqueous iodine solution and an aqueous potassium solution and drying the PVA film therewith, and measuring iodine and potassium concentrations of the dyeing bath using an iodine densitometer and a potassium densitometer; complementary dyeing including dipping the PVA film dyed with iodine and potassium in a complementary bath containing an aqueous potassium solution and dyeing the PVA film therewith, and measuring a potassium concentration of the complementary bath using a potassium densitometer; primary drying including drying the PVA film including the oriented iodine and potassium in a device oven and measuring a temperature of the device oven using a device oven thermometer; secondary drying the PVA film in a 4-stage oven and measuring a temperature of the 4-stage oven using a 4-stage oven thermometer; and controlling using a central controller including predicting the color value of the polarizing film, based on input data measured using the iodine and potassium densitometers of the dyeing bath, the potassium densitometer of the complementary bath and the thermometers of the device oven and the 4-stage oven, and information regarding characteristics of the PVA film introduced into the continuous process, and controlling temperatures of the device oven and the 4-stage oven and amounts of compositions fed to the dyeing bath and the complementary bath.

Accordingly, the method for controlling polarizing film color according to the present invention predicts a color value of a polarizing film, based on iodine and potassium concentrations of the dyeing bath, potassium concentration of the complementary bath and temperature data of the device oven and 4-stage oven that have the highest correlation among factors affecting a color value of the polarizing film, and information regarding characteristics of the PVA film introduced into the continuous process, and controls amounts of composition fed to the dyeing bath and the complementary bath, based on the predicted color value, thereby minimizing loss of the PVA film, as described above.

For example, during the dyeing, the PVA film may be dipped in a dyeing bath containing a 20 to 40° C. aqueous solution comprising iodine and potassium, and then dyed with the solution. During the drying, the PVA film may be dried at a temperature of 40 to 60° C. in the device oven and the 4-stage oven.

Meanwhile, the aqueous iodine solution may be an aqueous solution having an iodine concentration and a potassium iodide concentration of 0.01 to 1% by weight and 0.01 to 10% by weight, respectively.

In a preferred embodiment, the method for controlling a polarizing film color may further include washing a polyvinyl alcohol (PVA) film as a substrate film and drawing the PVA film using a drawing roller to orient the dyed iodine and potassium.

If desired, the drawing includes primary drawing and secondary drawing according to variation of rotation speed of the drawing roller. In the primary drawing, the PVA film may have a drawing ratio of 1.5 to 3.0 times and in the secondary drawing, the PVA film may have a drawing ratio of 2.0 to 3.0 times.

Accordingly, the PVA film obtained after the secondary drawing described above may have an overall draw ratio of at least 3.5 times, thus enabling production of a polarizing film having excellent optical properties.

In a preferred embodiment, the method for controlling polarizing film color may further include swelling the washed PVA film in the swelling bath and cleaning the PVA film in the cleaning bath.

Effects of Invention

As apparent from the fore-going, the apparatus for controlling polarizing film color according to the present invention comprises a central controller to predict a color value of the polarizing film, on the basis of information regarding characteristics of input data measured through the iodine and potassium densitometers of the dyeing bath, the potassium densitometer of the complementary bath, and the thermometers of the device oven and the 4-stage oven, and information regarding characteristics of the PVA film introduced into the continuous process, and to control temperatures of the device oven and the 4-stage oven and amounts of compositions fed to the dyeing bath and complementary bath, thus predicting a color value of the polarizing film on the basis of characteristics of the PVA film fed in order to manufacture the polarizing film and controlling temperatures of respective components and amounts of fed compositions, thereby reducing loss of material for the PVA film, minimizing production line shutdown and greatly improving color qualities of the polarizing film.

BRIEF DESCRIPTION OF THE DRAWINGS

The above and other objects, features and other advantages of the present invention will be more clearly understood from the following detailed description taken in conjunction with the accompanying drawings, in which.

BEST MODE

Hereinafter, the present invention will be described in more detail with reference to the annexed drawings, but the scope of the present invention is not limited to the description.

Figure 1:
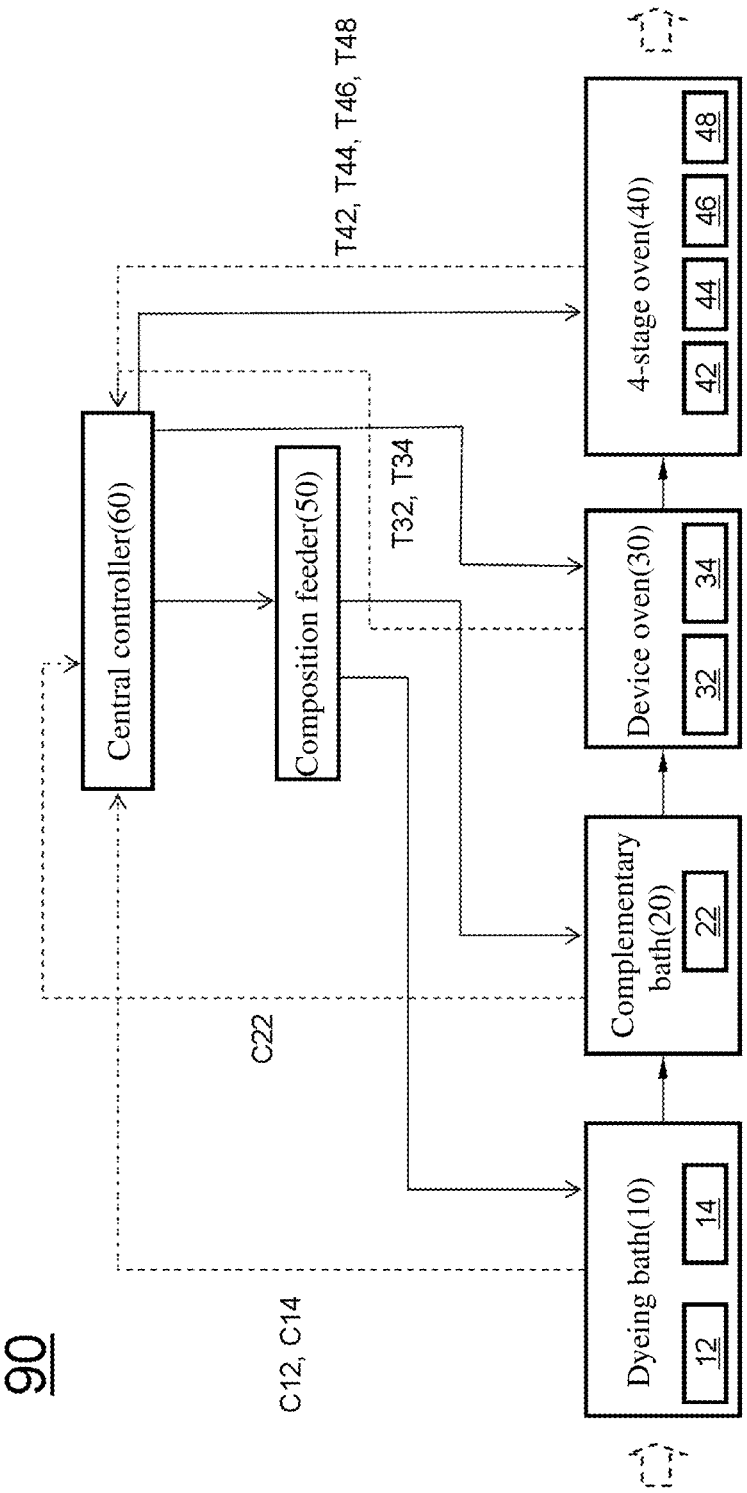
FIG. 1 is a schematic block diagram illustrating an apparatus for controlling a color of a polarizing film according to an embodiment of the present invention.

FIG. 1 is a schematic block diagram illustrating an apparatus for controlling a polarizing film color according to one embodiment of the present invention.

Referring to FIG. 1, the apparatus for controlling a polarizing film color according to the present invention 90 includes a dyeing bath 10 to dip a washed PVA film in an aqueous iodine solution and dye the film therewith, a complementary bath 20 to dip the PVA film in an aqueous potassium solution and dye the film therewith, a device oven 30 to dry the PVA film having the oriented iodine and potassium, a 4-stage oven 40 to dry the PVA film dried in the device oven, a composition feeder 50 to add the composition fed to the dyeing bath 10 and the complementary bath 20, based on the color value result predicted by a central controller 60, and the central controller 60.

Accordingly, sequentially passing the PVA film through the dyeing bath 10, the complementary bath 20, the device oven 30 and the 4-stage oven 40 forms a polarizing film.

The dyeing bath 10 is provided with an iodine densitometer 12 and a potassium densitometer 14 to measure an iodine concentration C12 and a potassium concentration C14, respectively. The complementary bath 20 is provided with a potassium densitometer 22 to measure a potassium concentration C22.

Also, the device oven 30 including two ovens and the 4-stage oven 40 including four ovens are provided with two device oven thermometers 32 and 34 and four 4-stage oven thermometers 42, 44, 46 and 48 to measure temperatures of ovens T32, T34, T42, T44, T46, and T48.

The central controller 60 predicts the color value of the polarizing film based on input data measured using iodine and potassium densitometers 12 and 14 of the dyeing bath 10, the potassium densitometer 22 of the complementary bath 20, and the thermometers 32, 34, 42, 44, 46 and 48 of the device oven 30 and the 4-stage oven 40, and information regarding characteristics of the PVA film introduced into the continuous process, and thereby controls temperatures of the device oven 30 and the 4-stage oven 40 and amounts of composition fed to the dyeing bath 10 and the complementary bath 20.

The composition fed to the dyeing bath 10 comprises iodine and potassium, while the composition fed to the complementary bath 20 comprises potassium.

The prediction of color value of the PVA film is preferably accomplished using a PVA film color value prediction model based on partial least squares.

Figure 2:
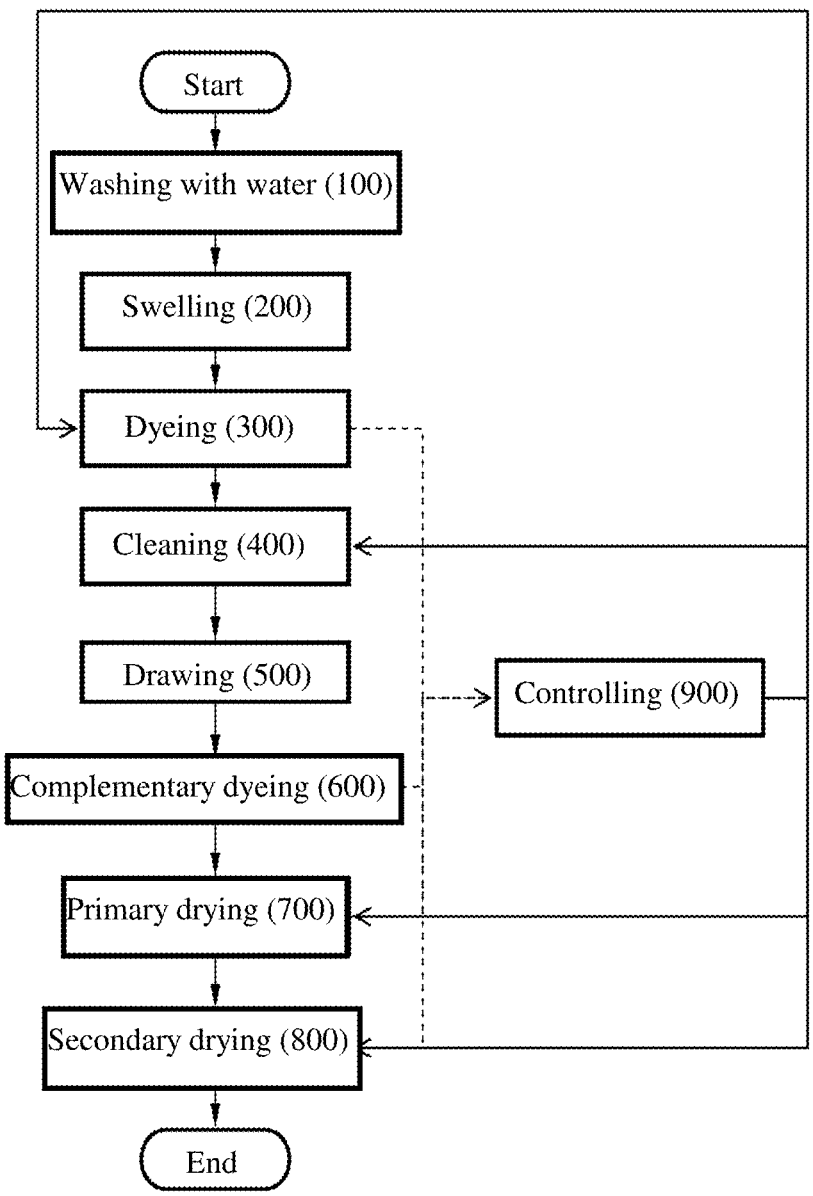
FIG. 2 is a schematic flowchart illustrating a method for controlling a color of a polarizing film according to another embodiment of the present invention.

FIG. 2 is a schematic flowchart showing a method for controlling a color of a polarizing film according to another embodiment of the present invention.

Referring to FIGS. 2 and 1, the method for controlling a polarizing film color 902 according to the present invention includes washing a polyvinyl alcohol (PVA) film as a substrate film (100); swelling the washed PVA film in a swelling bath (200); dyeing including dipping the washed PVA film in a dyeing bath containing an aqueous iodine solution and an aqueous potassium solution 10 and drying the PVA film therewith, and measuring iodine and potassium concentrations of the dyeing bath 10 using an iodine densitometer 12 and a potassium densitometer 14 (300); cleaning the dyed PVA film in a cleaning bath (400); drawing the PVA film using a drawing roller to orient the dyed iodine and potassium (500); complementary dyeing including dipping the PVA film dyed with iodine and potassium in a complementary bath 20 containing an aqueous potassium solution, dyeing the PVA film therewith and measuring a potassium concentration of the complementary bath 20 using the potassium densitometer 22 (600); primary drying including drying the PVA film including the oriented iodine and potassium in a device oven 30 and measuring a temperature of the device oven 30 using device oven thermometers 32 and 34 (700); secondary drying including dyeing the PVA film dried in the device oven 30 in a 4-stage oven 40 and measuring a temperature of the 4-stage oven 40 using 4-stage oven thermometers 42, 44, 46 and 48 (800); and controlling using a central controller 60 including predicting the color value of the polarizing film, based on input data measured using iodine and potassium densitometers 12 and 14 of the dyeing bath 10, the potassium densitometer 22 of the complementary bath 20, and the thermometers 32, 34, 42, 44, 46 and 48 of the device oven 30 and the 4-stage oven 40, and information regarding characteristics of the PVA film introduced into the continuous process, and controlling temperatures of the device oven 30 and the 4-stage oven 40 and amounts of compositions fed to the dyeing bath 10 and the complementary bath 20 (900).

During the dyeing (300), the PVA film is dipped in a 20 to 40° C. dyeing bath 10 containing an aqueous solution comprising iodine and potassium and is then dyed with the solution. In the primary and secondary drying processes (700) and (800), the PVA film is dried at a temperature of 40 to 60° C. in the device oven 30 and the 4-stage oven 40.

Figure 3:
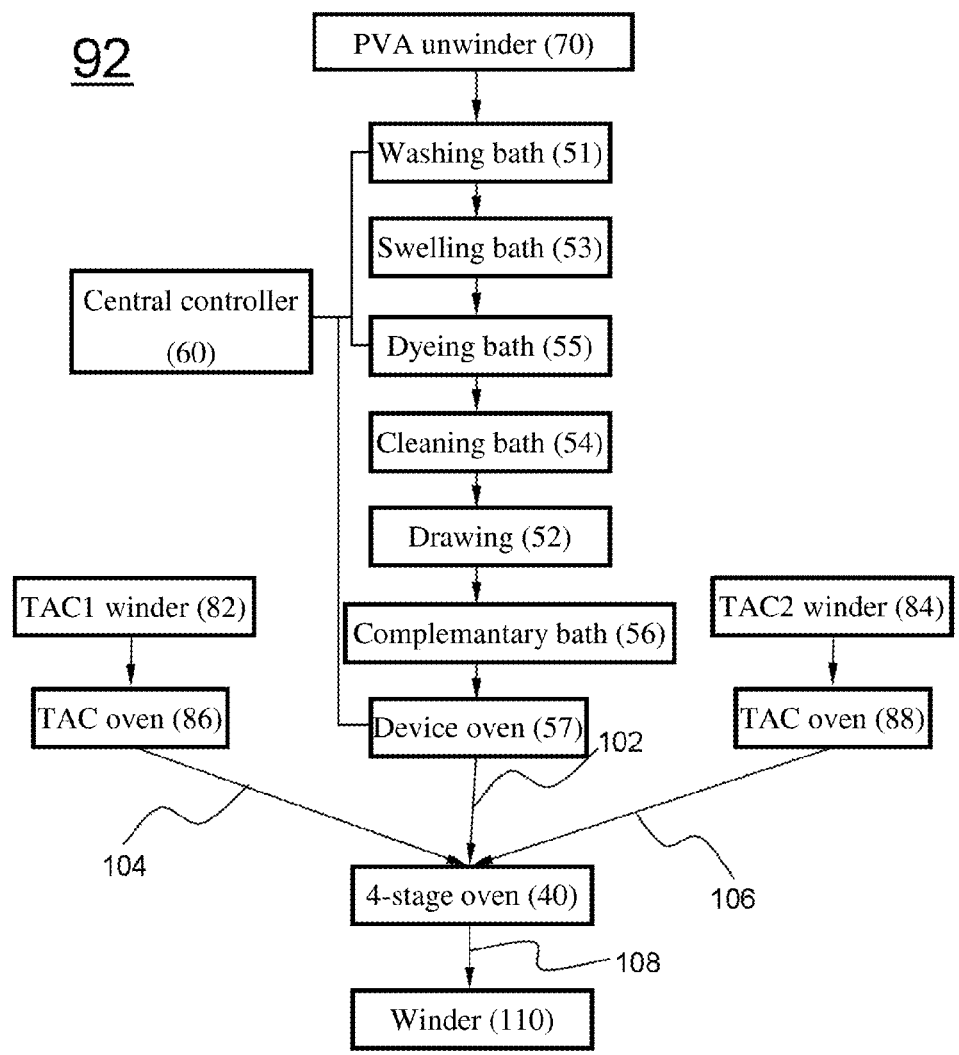
FIG. 3 is a schematic flowchart illustrating a method for controlling a color of a polarizing film according to another embodiment of the present invention.
Figure 4:
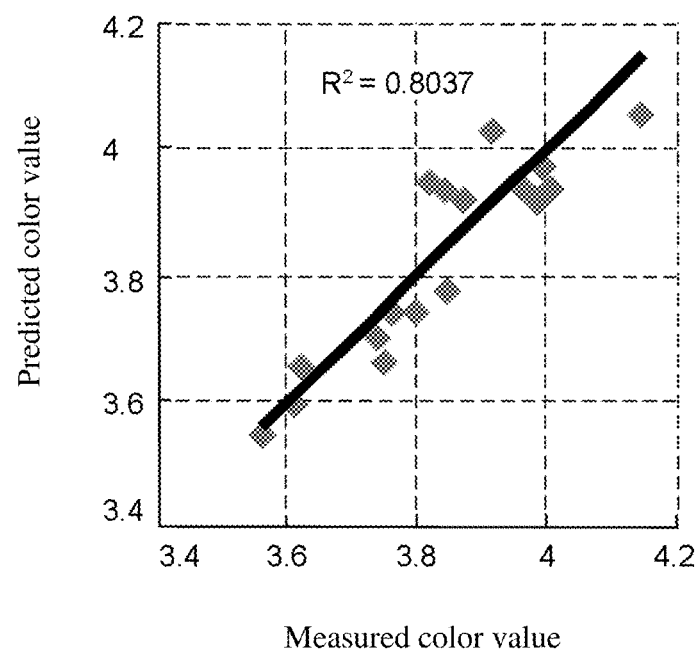
FIG. 4 is a graph showing correlation between a predicted color value and a measured color value according to another embodiment of the present invention.

FIG. 3 is a schematic flowchart illustrating a method for controlling a color of a polarizing film according to another embodiment of the present invention.

Referring to FIG. 3 together with FIGS. 1 and 2, a polarizing sheet 108 is manufactured by adhering protective films 104 and 106 made of triacetyl cellulose (TAC) to an upper surface and a lower surface of a polarizing film 102 drawn by the polarizing film color controller 90 of FIG. 1, respectively. TACs drawn from a TAC1 winder 82 and a TAC2 winder 84 pass through TAC ovens 86 and 88 and are then bonded to upper and lower surfaces of the PVA film.

The drawing process (500) includes primary drawing using a first drawing bath and secondary drawing using a second drawing bath according to variation of rotation speed of the drawing roller. In the primary drawing, the PVA film has a drawing ratio of 1.5 to 3.0 times, and in the secondary drawing, the PVA film has a drawing ratio of 2.0 to 3.0 times.

Also, the apparatus for controlling a polarizing film color 92 includes: a washing bath 51 to wash the PVA film drawn from a polyvinyl alcohol (PVA, a substrate film) un-winder 70; a swelling bath 53 to swell the washed PVA film; a dyeing bath 55 to dip the PVA film in an aqueous iodine solution and an aqueous potassium solution and dye the PVA film therewith; a drawing bath 52 to draw the PVA film using a drawing roller to orient the dyed iodine and potassium; a complementary bath 56 to dip the PVA film in an aqueous potassium solution and dye the film therewith; a cleaning bath 54 to wash the dyed PVA film; and a device oven 57 to dry the PVA film comprising the oriented iodine and potassium.

Also, the apparatus 92 for controlling a polarizing film color includes a 4-stage oven 40 to dry the PVA film dried in the device oven 57 and a winder 110 to wind the PVA film dried in the 4-stage oven 40.

Figure 5:
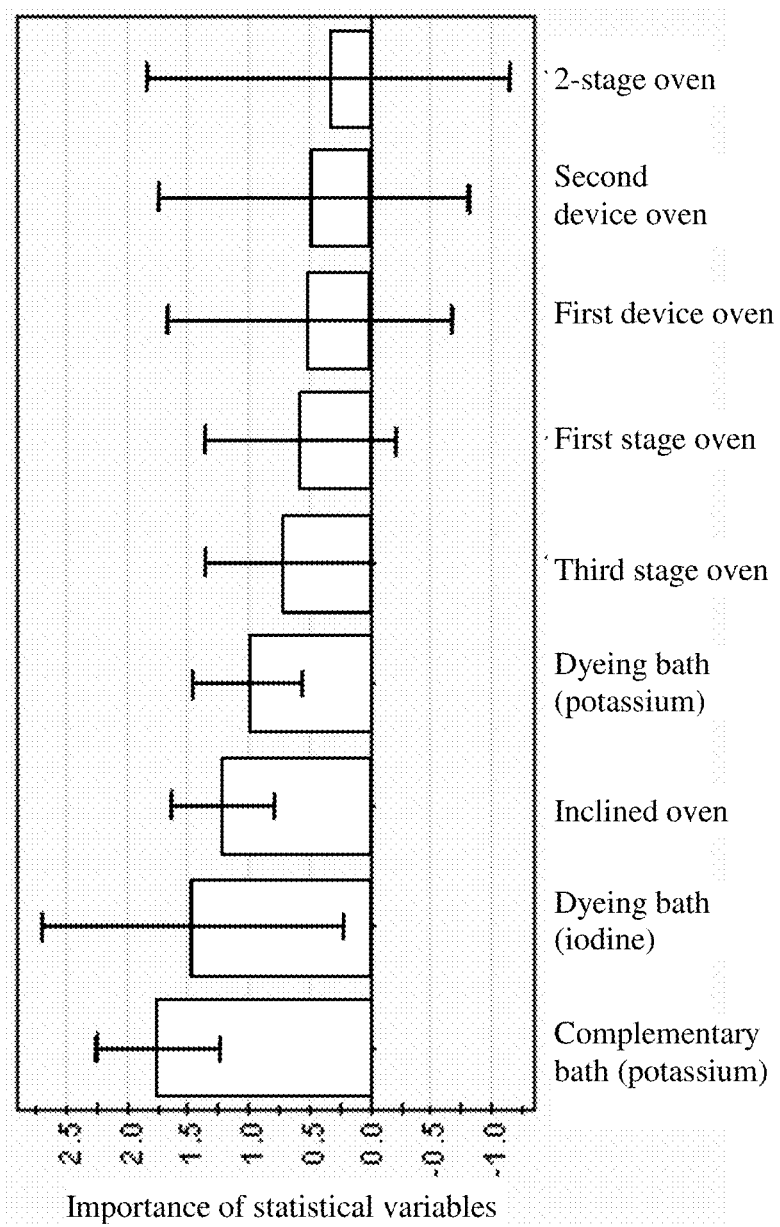
FIG. 5 is a graph showing an importance of statistical variables regarding nine primary process variables.

FIG. 5 is a graph showing the importance of statistical variables regarding nine primary process variables.

As can be seen from FIG. 5, importance of statistical variables increases from a potassium concentration of the complementary bath, an iodine concentration of the dyeing bath, a temperature of the inclined oven, a potassium concentration of the dyeing bath, a third-stage temperature of the third stage oven, a first stage temperature of the third stage oven, a temperature of the second device oven, a temperature of the first device oven, and the second-stage temperature of the third stage oven, in this order.

Also, a bar graph shows an average of corresponding variables and a dot line means a deviation of the corresponding variable.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An apparatus for controlling a color of a polarizing film that exhibits polarizing properties, by dyeing a substrate film with iodine and potassium through a continuous process and orienting the substrate film, wherein the apparatus comprises:
a dyeing bath configured to dye a polyvinyl alcohol film by dipping the polyvinyl alcohol film has been previously washed, the dyeing bath including an aqueous iodine solution and an aqueous potassium solution, an iodine densitometer, and a potassium densitometer to measure concentrations of iodine and potassium of the dyeing bath;
a complementary bath configured to dye the polyvinyl alcohol film in an aqueous potassium solution by dipping the complementary bath including a potassium densitometer to measure a concentration of potassium of the complementary bath;
a composition feeder to feed amounts of a composition to the dyeing bath and a composition to the complementary bath;
a device oven configured to dry the polyvinyl alcohol film which was previously dipped in the dyeing bath and the complementary bath, the device oven including a device oven thermometer to measure a temperature of the device oven;
a 4-stage oven configured to dry the polyvinyl alcohol film which was previously dried in the device oven, the 4-stage oven including a 4-stage oven thermometer to measure a temperature of the 4-stage oven; and
a central controller connected to the iodine and potassium densitometer of the dyeing bath and the potassium densitometer of the complementary bath, and configured to predict a color value of the polyvinyl alcohol film on the basis of input data measured through the iodine and potassium densitometers of the dyeing bath, the potassium densitometer of the complementary bath, and the thermometers of the device oven and the 4-stage oven, and
said central controller is configured to control temperatures of the device oven and the 4-stage oven and amounts of compositions fed to the dyeing bath and complementary bath,
wherein said central controller is configured to predict the color value of the polyvinyl alcohol film with a polyvinyl alcohol film color value prediction model based on partial least squares.

2. The apparatus according to claim 1, wherein the device oven comprises two ovens.

3. The apparatus according to claim 1, wherein the 4-stage oven comprises four ovens.

4. The apparatus according to claim 1, wherein the composition fed to the dyeing bath comprises iodine and potassium.

5. The apparatus according to claim 1, wherein the composition fed to the complementary bath comprises potassium.

6. The apparatus according to claim 1,
wherein the composition feeder adds the composition to the dyeing bath and the composition to the complementary bath, based on the color value of the polyvinyl alcohol film predicted by the central controller.

7. The apparatus according to claim 1, wherein the polyvinyl alcohol film color value prediction model comprises a function regarding a potassium concentration of the complementary bath, iodine and potassium concentrations of the dyeing bath, a temperature of the device oven including two ovens, and a temperature of the 4-stage oven including four ovens.

8. The apparatus according to claim 7, wherein the polyvinyl alcohol film color value prediction model (y) is represented by the following Equation 1:

$$y = ax_1 + bx_2 + cx_3 + dx_4 + ex_5 + fx_6 + gx_7 + hx_8 + ix_9 + h \quad (1)$$

wherein $x_1$ is a potassium concentration of a complementary bath, $x_2$ is an iodine concentration of the dyeing bath, $x_3$ is a potassium concentration of the dyeing bath, $x_4$ is a temperature of an inclined oven, $x_5$ is a temperature of a first stage oven, $x_6$ is a temperature of a second stage oven, $x_7$ is a temperature of a third stage oven, $x_8$ is a temperature of a first device oven, and $x_9$ is a temperature of a second device oven, a, b, c, d, e, f, g, h, and i are regression coefficients obtained through partial least squares, and h is a constant obtained through partial least squares.

9. The apparatus according to claim 1, further comprising:
a washing bath to wash the polyvinyl alcohol (PVA) film as the substrate film with water; and
a drawing bath to draw the polyvinyl alcohol film dyed with iodine and potassium using a drawing roller and thereby orient the polyvinyl alcohol film after being dyed with iodine and potassium.

10. The apparatus according to claim 1, further comprising:
a swelling bath to swell the polyvinyl alcohol film which has been previously washed; and
a cleaning bath to clean the polyvinyl alcohol film which has been previously dyed.

* * * * *